(12) United States Patent
Nakajima et al.

(10) Patent No.: US 10,073,564 B2
(45) Date of Patent: Sep. 11, 2018

(54) INPUT DEVICE, CONTROL METHOD OF INPUT DEVICE, AND PROGRAM

(71) Applicant: Alps Electric Co., Ltd., Tokyo (JP)

(72) Inventors: Satoshi Nakajima, Miyagi-ken (JP);
Satoshi Hayasaka, Miyagi-ken (JP);
Kohei Kitagawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 28 days.

(21) Appl. No.: 15/349,755

(22) Filed: Nov. 11, 2016

(65) Prior Publication Data

US 2017/0269784 A1   Sep. 21, 2017

(30) Foreign Application Priority Data

Mar. 15, 2016   (JP) ................................. 2016-050777

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04108* (2013.01)

(58) Field of Classification Search
None
See application file for complete search history.

(56) References Cited

U.S. PATENT DOCUMENTS

2012/0242617 A1* 9/2012 Lee ..................... G06F 3/0418
345/174

FOREIGN PATENT DOCUMENTS

JP   2010-257046   11/2010

* cited by examiner

*Primary Examiner* — Joseph Haley
(74) *Attorney, Agent, or Firm* — Beyer Law Group LLP (57) ABSTRACT

An input device includes a sensor unit, a processing unit, a storage unit, and an interface unit. The processing unit includes: a change amount calculating section for calculating the temporal change amount of the electrostatic capacitance that is detected by the sensor unit and that changes according to the proximity degree of an object with respect to a detection surface; a determination section for determining a touch operation corresponding to an operation on the detection surface using a fingertip, a palm operation corresponding to an operation on the detection surface using a palm, and a grip operation corresponding to an operation on a conductor portion, based on the calculated change amount; and a reset section for performing reset processing in a case where the duration of a state, in which a palm operation is not determined and a grip operation is determined, is a first predetermined time or more.

17 Claims, 5 Drawing Sheets

INPUT DEVICE, CONTROL METHOD OF INPUT DEVICE, AND PROGRAM

CLAIM OF PRIORITY

This application claims benefit of Japanese Patent Application No. 2016-050777 filed on Mar. 15, 2016, which is hereby incorporated by reference.

BACKGROUND OF THE INVENTION

1. Field of the Invention

The present invention relates to an input device for inputting information corresponding to an operation, a control method of the input device, and a program.

2. Description of the Related Art

A sensor for detecting a change in electrostatic capacitance can detect the approach of an object (for example, a fingertip or a pen) with a simple configuration. For this reason, such a sensor is widely used in user interface devices of various electronic apparatuses, such as a touch pad of a notebook computer or a touch panel of a smart phone. In addition, there is also a device in which a conductive operating member is disposed along the outer edge of such a sensor so that an operation on the operating member (for example, an operation of pinching the operating member with fingertips) is detected based on a change in electrostatic capacitance in the vicinity of the outer edge of the sensor.

Generally, in this type of sensor, the approach of an object is detected based on a difference value (detection value–base value) from a base value corresponding to a detection value of the electrostatic capacitance in a state in which the object is not close. Since the change in electrostatic capacitance according to the approach of an object is very small, the detection value of the sensor is likely to be influenced by the temperature characteristics of an electronic circuit or the like. If the detection value changes according to the temperature, the difference value from the base value is also changed. Accordingly, the approach of the object may be erroneously determined. Typically, therefore, a fixed value is not used as a base value, and processing for updating the base value at an appropriate timing is performed. For example, Japanese Unexamined Patent Application Publication No. 2010-257046 discloses a proximity detection device that updates a base value when it is determined that an object, such as a fingertip, is not close.

However, a temperature change in the environment of use may occur even in a state in which an object is close to the detection surface. Generally, in a known device that detects the approach of an object based on the difference between the base value and the detection value, the base value is not updated during a period in which the object is determined to be close. Therefore, when a large temperature change occurs during the period, the approach of the object may be erroneously determined.

In addition, in the environment of use, such as the inside of a vehicle, a large temperature change is likely to occur in a short period of time. Accordingly, it is necessary to further consider the erroneous determination described above. For example, in a case where the above operating member disposed along the outer edge of the sensor is intended to adjust the temperature of an air conditioner, a temperature change inside the vehicle is likely to occur in response to the operation of the operating member. Thus, in a known device, there is a disadvantage in that it is not possible to respond to temperature changes or the like in a case where an object is close.

SUMMARY OF THE INVENTION

The invention provides an input device capable of suppressing erroneous determination due to temperature changes or the like even in a case where an object is close, a control method of the input device, and a program.

According to a first aspect of the invention, there is provided an input device for inputting information corresponding to an operation on a detection surface and a conductive conductor portion disposed along an outer edge of the detection surface. The input device includes: a sensor unit that detects an electrostatic capacitance that changes according to a proximity degree of an object with respect to the detection surface; a change amount calculation unit that calculates a temporal change amount of the detected electrostatic capacitance; a determination unit that determines a first operation corresponding to an operation on the detection surface using a fingertip, a second operation corresponding to an operation on the detection surface using a palm, and a third operation corresponding to an operation on the conductor portion, based on the calculated change amount; and a reset unit that performs reset processing in a case where a duration of a state, in which the second operation is not determined and the third operation is determined, is equal to or longer than a first predetermined time.

According to this configuration, in a case where the duration of a state, in which an operation (second operation) on the detection surface using a palm is not determined and an operation (third operation) on the conductor portion is determined, is equal to or longer than the first predetermined time, reset processing is performed. In addition, a user may bring a palm (or a part of the human body which may correspond to the palm) close to the detection surface and the conductor portion without an intention of operation, and the duration of the state may become long. However, a state in which the duration of the state, in which an operation using a palm is not determined and an operation on the conductor portion is determined, is long can be considered to be a state in which an abnormality has occurred in detection. That is, since the input device having the configuration described above detects the abnormalities of detection during a period in which an object is close and performs reset processing, it is possible to suppress erroneous determination due to temperature changes or the like even in a case where an object is close.

Preferably, the reset unit performs the reset processing in a case where the duration is equal to or longer than the first predetermined time and a peak value, which is a spatial maximum value of the calculated change amount on the detection surface, is equal to or greater than a first threshold value.

According to this configuration, "peak value is equal to or greater than the first threshold value" can be included in the conditions for performing reset processing.

Preferably, the reset unit performs the reset processing in a case where a state in which the peak value is equal to or greater than the first threshold value continues for a second predetermined time after the duration becomes equal to or longer than the first predetermined time.

According to this configuration, since reset processing is performed in a case where the state, in which the peak value is equal to or greater than the first threshold value, continues for the second predetermined time, it is possible to determine the abnormalities of detection more reliably.

Preferably, the determination unit determines the first operation in a case where the peak value is equal to or greater than the first threshold value.

According to this configuration, "peak value is equal to or greater than a threshold value used to determine an operation (first operation) on the detection surface using a fingertip" can be included in the conditions for performing reset processing.

Preferably, the determination unit determines the second operation in a case where a size of a region on the detection surface, in which the calculated change amount is equal to or greater than a second threshold value, is equal to or greater than a predetermined size.

According to this configuration, it is possible to determine an operation (second operation) on the detection surface using a palm based on the size of a region where the change amount of the electrostatic capacitance is equal to or greater than the second threshold value.

Preferably, the determination unit determines the third operation based on the change amount in vicinity of an outer edge of the detection surface.

According to this configuration, it is possible to determine an operation (third operation) on the conductor portion based on the change amount of the electrostatic capacitance in the vicinity of the outer edge of the detection surface.

Preferably, the change amount calculation unit calculates a difference between a base value, which is an electrostatic capacitance in a state in which an object is not close to the detection surface, and the detected electrostatic capacitance as the change amount, and the reset processing includes resetting the base value.

According to this configuration, it is possible to suppress erroneous determination due to temperature changes or the like by resetting the base value.

According to a second aspect of the invention, there is provided a control method of an input device for inputting information corresponding to an operation on a detection surface and a conductive conductor portion disposed along an outer edge of the detection surface. The control method of an input device includes: a step of detecting an electrostatic capacitance that changes according to a proximity degree of an object with respect to the detection surface; a step of calculating a temporal change amount of the detected electrostatic capacitance; a step of determining a first operation corresponding to an operation on the detection surface using a fingertip, a second operation corresponding to an operation on the detection surface using a palm, and a third operation corresponding to an operation on the conductor portion, based on the calculated change amount; and a step of performing reset processing in a case where a duration of a state, in which the second operation is not determined and the third operation is determined, is equal to or longer than a first predetermined time.

Preferably, in the step of performing the reset processing, the reset processing is performed in a case where the duration is equal to or longer than the first predetermined time and a peak value, which is a spatial maximum value of the calculated change amount on the detection surface, is equal to or greater than a first threshold value.

Preferably, in the step of performing the reset processing, the reset processing is performed in a case where a state in which the peak value is equal to or greater than the first threshold value continues for a second predetermined time after the duration becomes equal to or longer than the first predetermined time.

Preferably, in the determination step, the first operation is determined in a case where the peak value is equal to or greater than the first threshold value.

Preferably, in the determination step, the second operation is determined in a case where a size of a region on the detection surface, in which the calculated change amount is equal to or greater than a second threshold value, is equal to or greater than a predetermined size.

Preferably, in the determination step, the third operation is determined based on the change amount in vicinity of an outer edge of the detection surface.

Preferably, in the step of calculating the change amount, a difference between a base value, which is an electrostatic capacitance in a state in which an object is not close to the detection surface, and the detected electrostatic capacitance is calculated as the change amount, and the reset processing includes resetting the base value.

According to a third aspect of the invention, there is provided a program causing a computer to execute the control method of an input device described above.

DESCRIPTION OF THE PREFERRED EMBODIMENTS

Figure 1:
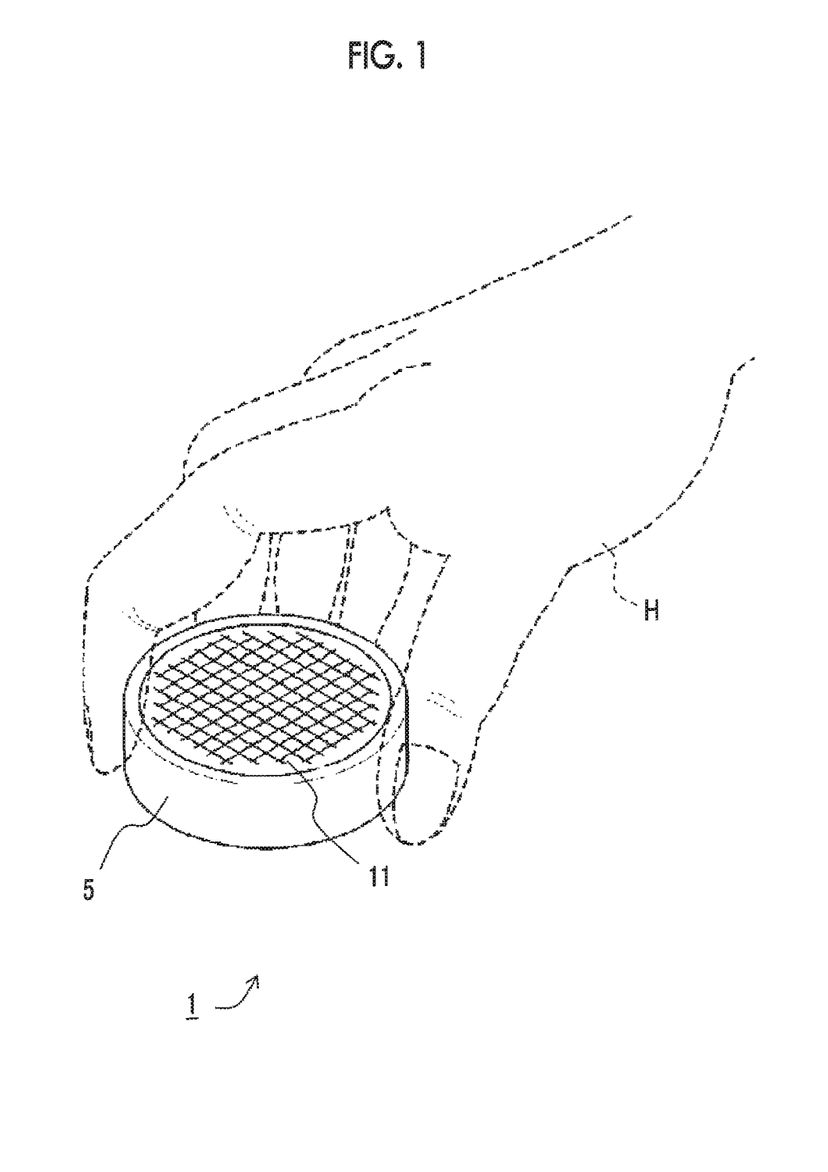
FIG. 1 is an external view of an input device according to an embodiment of the invention.
Figure 2:
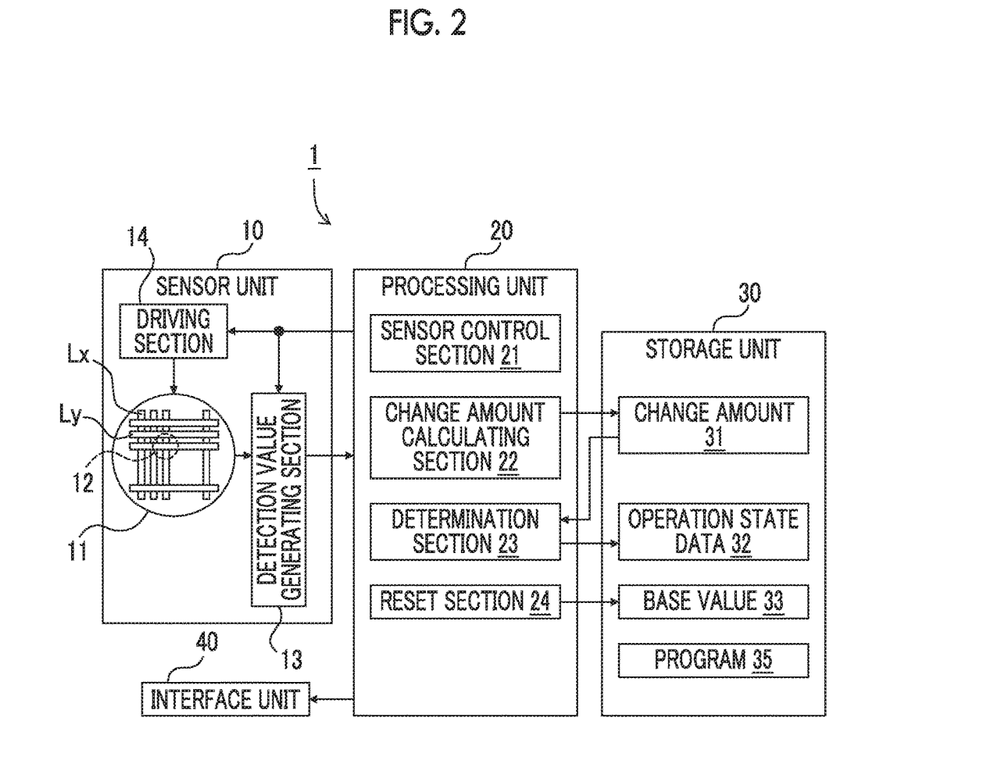
FIG. 2 is a diagram showing an example of the configuration of the input device.

Hereinafter, an input device according to an embodiment of the invention will be described. FIG. 1 is an external view of an input device 1 of the present embodiment, and FIG. 2 is a diagram showing an example of the configuration of the input device 1. As shown in FIG. 1, in the input device 1, an annular conductor portion 5 is disposed along the outer edge of a detection surface 11 having an approximately circular profile when viewed from above. The input device 1 is for inputting information corresponding to an operation on the detection surface 11 or the conductor portion 5 using a hand H of a person or the like. The conductor portion 5 is covered with a conductive material, or is formed of a conductive material. That is, the conductor portion 5 is a member having conductivity. The conductor portion 5 can also be formed so as to be rotatable along the outer edge of the detection surface 11.

As shown in FIG. 2, the input device 1 includes a sensor unit 10, a processing unit 20, a storage unit 30, and an interface unit 40.

Sensor Unit 10

The sensor unit 10 detects the proximity degree of an object, such as the hand H of a person, at each of a plurality of detection positions, and generates a detection value having a value corresponding to the proximity degree of the object, as a result of the detection, for each detection position. "Proximity" in this specification means being in the vicinity, and there is no limitation on whether or not an object, such as the hand H of a person, is in contact with a target. That is, "proximity" is a concept including not only being in the vicinity in a state in which an object, such as the hand H of a person, is not in contact with a target but also being in the vicinity in a state in which the object, such as the hand H of a person, is in contact with the target.

As shown in FIG. 2, the sensor unit 10 includes a sensor matrix (detection surface) 11 in which sensor elements (capacitors) 12 whose electrostatic capacitance changes according to the approach of an object are formed in a matrix, a detection value generating section 13 for generating a detection value corresponding to the electrostatic capacitance of each sensor element 12, and a driving section 14 for applying a driving voltage to the sensor element 12.

The sensor matrix 11 includes a plurality of driving electrodes Lx extending in a vertical direction and a plurality of detection electrodes Ly extending in a horizontal direction. The plurality of driving electrodes Lx are aligned in parallel to each other in the horizontal direction, and the plurality of detection electrodes Ly are aligned in parallel to each other in the vertical direction. The plurality of driving electrodes Lx and the plurality of detection electrodes Ly cross each other in a grid pattern, and are insulated from each other. The sensor element 12 is formed in the vicinity of an intersection between each driving electrode Lx and each detection electrode Ly. In addition, although the shape of each of the electrodes Lx and Ly is drawn in a rectangular shape in the example shown in FIG. 2, each of the electrodes Lx and Ly may have any shape (for example, a diamond pattern).

The driving section 14 applies a driving voltage to each sensor element 12 of the sensor matrix 11. Specifically, according to the control of the processing unit 20, the driving section 14 selects one driving electrode Lx in order from the plurality of driving electrodes Lx, and periodically changes the potential of the selected one driving electrode Lx. Since the potential of the driving electrode Lx is changed in a predetermined range, the driving voltage applied to the sensor element 12 that is formed in the vicinity of the intersection between the driving electrode Lx and the detection electrode Ly is changed in a predetermined range, and charge and discharge occur in the sensor element 12.

The detection value generating section 13 generates a detection value corresponding to electric charges transmitted from each detection electrode Ly when the sensor element 12 is charged or discharged according to the application of the driving voltage by the driving section 14. That is, the detection value generating section 13 samples electric charges transmitted from each detection electrode Ly at a timing synchronized with a periodic change in the driving voltage of the driving section 14, and generates a detection value corresponding to the result of the sampling.

For example, the detection value generating section 13 includes an electrostatic capacitance-voltage conversion circuit (CV conversion circuit) that outputs a voltage corresponding to the electrostatic capacitance of the sensor element 12 and an analog-digital conversion circuit (AD conversion circuit) that converts the output signal of the CV conversion circuit into a digital signal and outputs the digital signal as a detection value. The CV conversion circuit samples electric charges transmitted from the detection electrode Ly according to the control of the processing unit 20 whenever the driving voltage of the driving section 14 is periodically changed to charge or discharge the sensor element 12. Specifically, whenever positive or negative electric charges are transmitted from the detection electrode Ly, the CV conversion circuit transfers the electric charges or electric charges proportional thereto to a reference capacitor, and outputs a signal corresponding to the voltage generated in the reference capacitor. For example, the CV conversion circuit outputs a signal corresponding to the integrated value or average value of electric charges, which are periodically transmitted from the detection electrode Ly, or electric charges proportional to the electric charges. According to the control of the processing unit 20, AD conversion circuit converts the output signal of the CV conversion circuit into a digital signal at predetermined periods, and outputs the digital signal as a detection value.

The sensor unit 10 shown in the example described above detects the approach of an object according to a change in electrostatic capacitance (mutual capacitance) generated between the electrodes Lx and Ly. However, the approach of an object may also be detected using other various methods without being limited to this example. For example, the sensor unit 10 may detect the electrostatic capacitance (self-capacitance) generated between the electrode and ground according to the approach of an object. In the case of the method of detecting the self-capacitance, a driving voltage is applied to the detection electrode. In addition, the sensor unit 10 may use a resistance film method, an electromagnetic induction method, or the like without being limited to the electrostatic capacitance method.

Processing Unit 20

The processing unit 20 is a circuit for controlling the overall operation of the input device, and includes a computer that performs processing according to command codes of a program 35 stored in the storage unit 30. The entire processing of the processing unit 20 may be realized by the computer and a program, or a part or all of the processing of the processing unit 20 may be realized by a dedicated logic circuit.

As shown in FIG. 2, the processing unit 20 includes a sensor control section 21, a change amount calculating section 22, a determination section 23, and a reset section 24.

The sensor control section 21 controls the sensor unit 10 to perform a periodic detection operation of detecting the proximity degree of an object at a plurality of detection positions (sensor elements 12) of the sensor matrix 11 and generating the detection value for each cycle. Specifically, the sensor control section 21 controls the driving section 14 and the detection value generating section 13 so that the selection of a driving electrode and the generation of a pulse voltage in the driving section 14 and the selection of a detection electrode and the generation of a detection value in the detection value generating section 13 are periodically performed at the appropriate timing.

The change amount calculating section 22 calculates a temporal change amount 31 of the detection value detected by the sensor unit 10, and stores the temporal change amount 31 in the storage unit 30. Specifically, the change amount calculating section 22 calculates a difference between the detection value of the sensor unit 10 and a base value 33, which is a detection value in a state in which an object is not close to the detection surface 11, as the change amount 31. The base value 33 is set for each detection position (that is, for each sensor element 12) of the sensor matrix 11. The initial value of the base value 33 is set immediately after turning on the power of the input device 1, for example. Then, the base value 33 is appropriately updated based on the weighted average value of detection values in a state in which an object is not close to the detection surface 11 (for example, in a state in which no operation is determined), for example.

The determination section 23 determines an operation on the detection surface 11 and the conductor portion 5 based on the change amount 31 calculated by the change amount calculating section 22. Operations determined by the determination section 23 include a touch operation (first operation) corresponding to an operation on the detection surface 11 using a fingertip, a palm operation (second operation) corresponding to an operation on the detection surface 11 using a palm, and a grip operation (third operation) corresponding to an operation on the conductor portion 5. FIG. 1 shows a grip operation using the hand H of a person.

The determination section 23 determines a touch operation based on a peak value that is the spatial maximum value of the calculated change amount 31 on the detection surface 11. Specifically, the determination section 23 specifies one or more peak values on the detection surface 11, determines a touch operation in a case where the peak value is equal to or greater than a first threshold value TOUCH_TH, and generates operation state data 32 indicating a touch operation state and stores the operation state data 32 in the storage unit 30. The operation state data 32 indicating a touch operation state includes a position (coordinates) on the detection surface 11 corresponding to the peak value determined to be a touch operation. In the case of specifying a plurality of peak values based on the change amount 31, the determination section 23 performs the determination of a touch operation and the generation and storage of the operation state data 32 for each of the plurality of peak values.

In addition, the determination section 23 determines a palm operation based on the distribution of the calculated change amount 31 on the detection surface 11. Specifically, the determination section 23 specifies a region of the detection surface 11 where the change amount 31 is equal to or greater than a second threshold value, determines a palm operation in a case where the size of the region is equal to or greater than a predetermined size, and generates the operation state data 32 indicating a palm operation state and stores the operation state data 32 in the storage unit 30. The second threshold value can be the same value as the first threshold value described above (threshold value used in the determination of a touch operation).

In addition, the determination section 23 determines a grip operation based on the change amount 31 in the vicinity of the outer edge of the detection surface 11. Specifically, the determination section 23 determines a grip operation in a case where the change amount 31 at each of a plurality of detection positions corresponding to the vicinity of the outer edge of the detection surface 11 satisfies predetermined conditions (for example, conditions in which the number of detection positions where the change amount 31 is equal to or greater than a predetermined threshold value, among the plurality of detection positions corresponding to the vicinity of the outer edge of the detection surface 11, is equal to or greater than a predetermined number), generates the operation state data 32 indicating a grip operation state, and stores the operation state data 32 in the storage unit 30.

The reset section 24 performs reset processing when predetermined reset conditions are satisfied. Specifically, the reset section 24 performs reset processing in a case where the duration of a state in which a palm operation is not determined and a grip operation is determined is equal to or longer than a first predetermined time and the peak value is equal to or greater than the first threshold value TOUCH_TH. More specifically, the reset section 24 performs the reset processing in a case where a state in which the peak value is equal to or greater than the first threshold value TOUCH_TH continues for a second predetermined time after the duration of a state in which a grip operation is determined becomes equal to or longer than the first predetermined time.

The reset processing performed by the reset section 24 includes resetting (initializing) the base value 33. For example, the reset processing is processing for returning the state of the input device 1 to the state immediately after power-on. In this case, not only the base value 33 but also at least a part of information including the change amount 31 and the operation state data 32, which is stored in the storage unit 30, is reset (initialized).

Storage Unit 30

The storage unit 30 stores constant data or variable data used in the processing of the processing unit 20, the program 35 to be executed by a computer in the processing unit 20, and the like. The storage unit 30 is configured to include a volatile memory such as a DRAM or a SRAM, a nonvolatile memory such as a flash memory, a hard disk, and the like, for example.

Interface Unit 40

The interface unit 40 is a circuit for exchanging data between an input device and other control devices (for example, an IC for control of an information device in which an input device is mounted). The processing unit 20 outputs the information stored in the storage unit 30 to a control device (not shown) through the interface unit 40. In addition, the interface unit 40 may acquire a program to be executed by the computer in the processing unit 20 from a disk drive device (not shown; a device for reading a program recorded in a non-transitory recording medium), a server, or the like, and may load the program to the storage unit 30.

Figure 3:
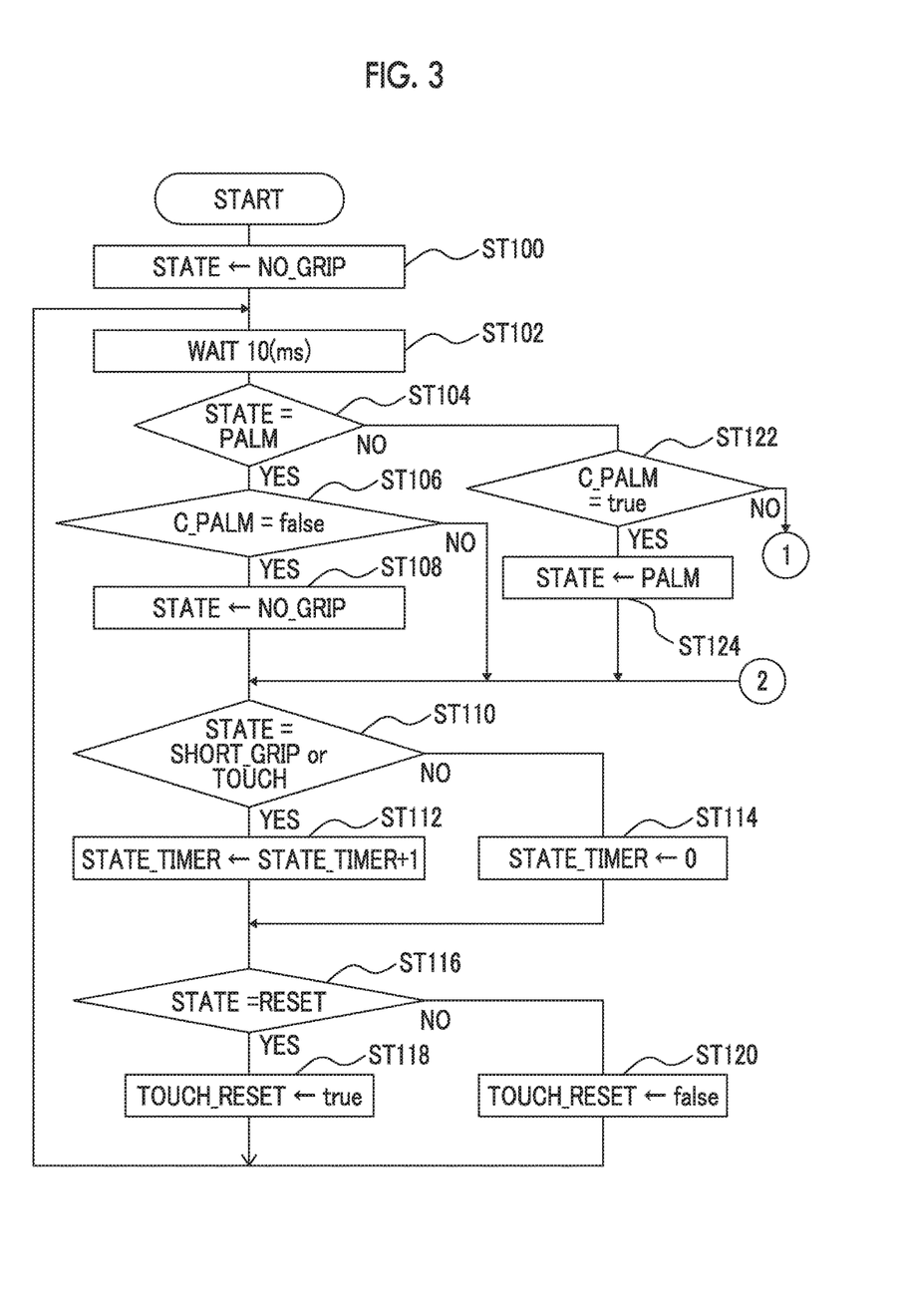
FIG. 3 is a flowchart showing the processing performed by a determination section.
Figure 4:
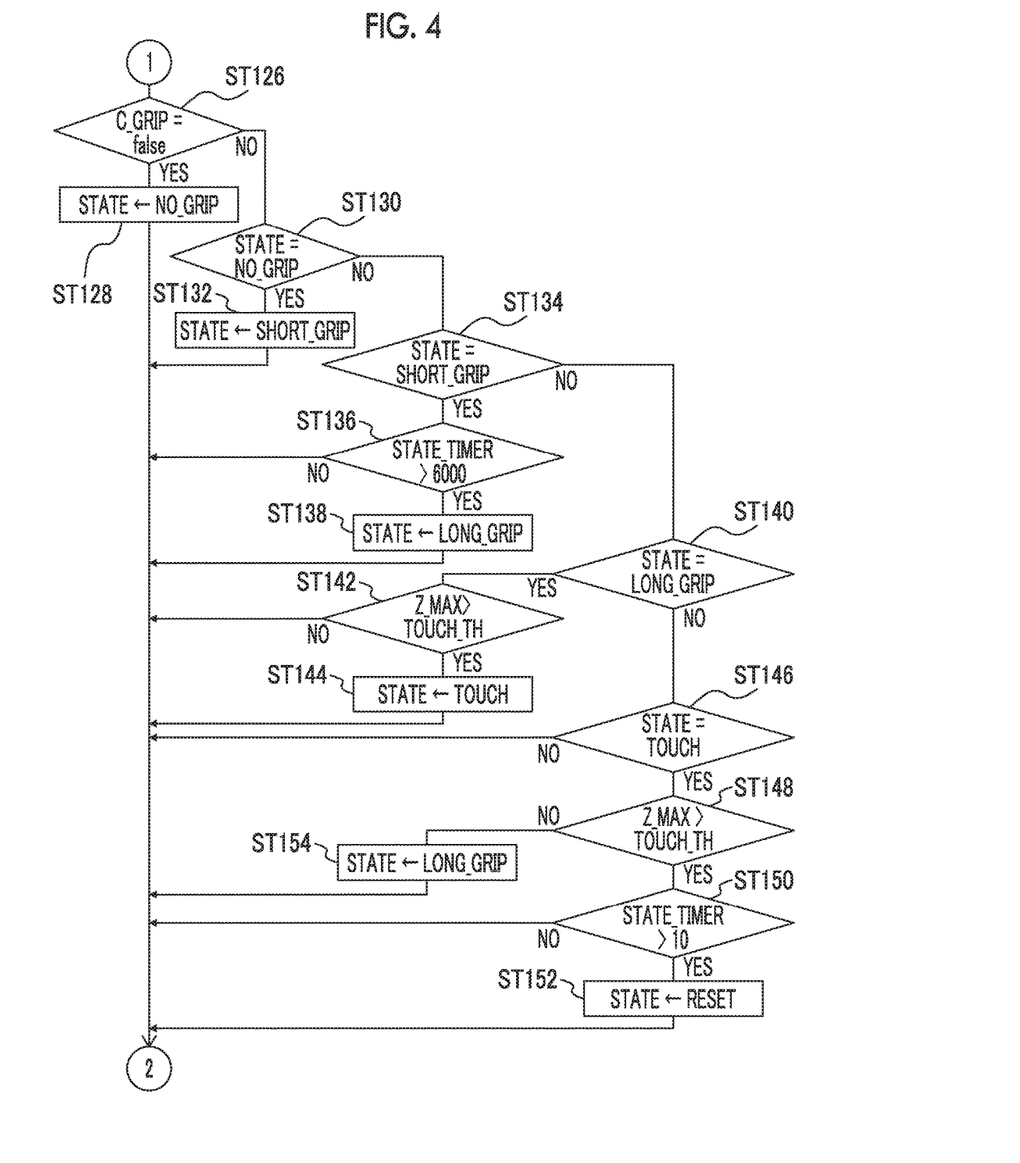
FIG. 4 is a flowchart showing the processing performed by the determination section.

Next, the operation of the input device 1 having the above configuration will be described. FIGS. 3 and 4 are flowcharts showing processing that is performed by the determination section 23 in order to detect abnormalities relevant to a grip operation due to temperature changes or the like. This processing is performed after turning on the power of the input device 1.

As shown in FIG. 3, when the power of the input device 1 is turned on, a value NO_GRIP indicating a non-grip operation state is first set in a variable STATE indicating a determination state regarding abnormality detection (ST100). Then, after a wait of a predetermined time (in the example shown in FIG. 3, 10 milliseconds) (ST102), it is determined whether or not a value PALM indicating a palm operation state has been set in the variable STATE (ST104).

Immediately after the power is turned on, the determination state is a non-grip operation state (NO in ST104). Accordingly, it is then determined whether or not a value true indicating that a palm operation has been determined is set in a variable C_PALM indicating the determination result of palm operation (ST122). As described above, the determination of palm operation is performed based on the distribution of the change amount 31 on the detection surface 11, and the result of the determination is set in the variable C_PALM.

Then, in a case where a palm operation has not been determined (NO in ST122), it is determined whether or not a value false indicating that a grip operation has not been determined is set in a variable C_GRIP indicating the determination result of grip operation (ST126), as shown in FIG. 4. As described above, the determination of grip operation is performed based on the change amount 31 in the vicinity of the outer edge of the detection surface 11, and the result of the determination is set in the variable C_GRIP.

Then, in a case where a grip operation has not been determined (YES in ST126), the setting of the value NO_GRIP for the variable STATE is maintained (ST128). Then, it is determined whether or not a value SHORT_GRIP indicating a short grip operation state or a value TOUCH indicating an abnormal state is set in the variable STATE (ST110).

In this stage, since the value NO_GRIP is set in the variable STATE (NO in ST110), a value 0 is then set in a variable STATE_TIMER indicating the duration of a specific determination state (ST114). Then, it is determined whether or not a value RESET, which indicates a state in which reset processing is required, is set in the variable STATE (ST116). In this stage, since the value NO_GRIP is set in the variable STATE (NO in ST116), a value false indicating that the execution of reset processing is not required is then set in a variable TOUCH_RESET indicating the necessity of the execution of reset processing (ST120), and the process returns to ST102 (wait of a predetermined time).

Then, while the value false is set in the variable C_PALM and the value false is set in the variable C_GRIP (that is, while a palm operation or a grip operation is not determined), the processing described above is repeatedly performed.

Then, when a grip operation is determined, it is determined that a value true is set in the variable C_GRIP in ST126 (NO in ST126). Then, it is determined whether or not the value NO_GRIP is set in the variable STATE (ST130). In this stage, since the value NO_GRIP is set in the variable STATE (YES in ST130), a value SHORT_GRIP indicating a short grip operation state is then set in the variable STATE (ST132).

Then, in ST110, it is determined that the value SHORT_GRIP is set in the variable STATE (YES in ST110), and 1 is added to the variable STATE_TIMER (ST112).

Then, when the state in which a grip operation has been determined continues (NO in ST126), the value SHORT_GRIP is continuously set in the variable STATE (NO in ST130 and YES in ST134). Then, it is determined whether or not the value of the variable STATE_TIMER exceeds a predetermined value (in the example shown in FIG. 4, 6000) (ST136). Until the value of the variable STATE_TIMER exceeds the predetermined value, while a state in which a palm operation is not determined and a grip operation is determined continues, processing of adding 1 to the variable STATE_TIMER (ST112) is repeatedly performed.

On the other hand, when a palm operation is determined before the value of the variable STATE_TIMER exceeds the predetermined value (YES in ST122), the value PALM indicating a palm operation state is set in the variable STATE (ST124), and a value 0 is set in the variable STATE_TIMER (ST114). That is, the determination state becomes a palm operation state, and the duration of the short grip operation state is reset. Then, when a palm operation is not determined (YES in ST106), the value NO_GRIP is set in the variable STATE (ST108). That is, the determination state returns to a non-grip operation state.

In addition, when a grip operation is not determined before the value of the variable STATE_TIMER exceeds the predetermined value (YES in ST126), the value NO_GRIP is set in the variable STATE (ST128). Then, a value 0 is set in the variable STATE_TIMER (ST114). That is, the determination state returns to the non-grip operation state, and the duration of the short grip operation state is reset.

When the state in which a palm operation is not determined and a grip operation is determined continues so that the value of the variable STATE_TIMER exceeds the predetermined value (YES in ST136), a value LONG_GRIP indicating a long grip operation state is set in the variable STATE (ST138), and a value 0 is set in the variable STATE_TIMER (ST114). That is, the determination state becomes a long grip operation state, and the duration of the short grip operation state is reset.

In the example shown in FIGS. 3 and 4, a wait of 10 milliseconds is given in ST102 that is repeatedly executed, and 1 is added to the variable STATE_TIMER in ST112 that is repeatedly executed. That is, being determined that the value of the variable STATE_TIMER exceeds a predetermined value 6000 in ST136 means that an abnormal state continues for 60 seconds (6000×10 milliseconds). The value of 60 seconds is an example of the first predetermined time of the embodiment of the invention.

When the value LONG_GRIP is set in the variable STATE (YES in ST140), it is then determined whether or not a peak value Z_MAX is greater than the first threshold value TOUCH_TH (ST142). The first threshold value TOUCH_TH is a threshold value used in the determination of a touch operation. That is, a case where it is determined that the peak value Z_MAX is greater than the first threshold value TOUCH_TH in ST142 is a case in which a touch operation is determined even though a grip operation is determined. Typically, when a grip operation of pinching the conductor portion 5 with fingertips is being performed, a touch operation of touching the detection surface 11 with a fingertip is not performed (refer to FIG. 1).

Then, in a case where the peak value Z_MAX is equal to or less than the first threshold value TOUCH_TH (NO in ST142), a long grip operation state is maintained. Then, while the long grip operation state is maintained, determination in ST142 is repeatedly performed.

On the other hand, in a case where the peak value Z_MAX is greater than the first threshold value TOUCH_TH (YES in ST142), the value TOUCH indicating an abnormal state is set in a value STATE (ST144). When the value TOUCH is set in the variable STATE (YES in ST110), 1 is added to the variable STATE_TIMER (ST112). Then, it is determined whether or not a state in which the peak value Z_MAX is greater than the first threshold value TOUCH_TH continues (ST148). In a case where the peak value Z_MAX is equal to or less than the first threshold value TOUCH_TH (NO in ST148), the value LONG_GRIP is set in the variable STATE (ST154). That is, the determination state returns to the long grip state.

On the other hand, in a case where the state in which the peak value Z_MAX is greater than the first threshold value TOUCH_TH continues (YES in ST148), it is determined whether or not the value of the variable STATE_TIMER exceeds a predetermined value (in the example shown in FIG. 4, 10) (ST150). Until the value of the variable STATE_TIMER exceeds the predetermined value, while a state in which a palm operation is not determined and a grip operation is determined continues and the state in which the peak value Z_MAX is greater than the first threshold value TOUCH_TH continues, processing of adding 1 to the variable STATE_TIMER (ST112) is repeatedly performed.

Then, when the value of the variable STATE_TIMER exceeds the predetermined value (YES in ST150), the value RESET indicating a state in which reset processing is required is set in the variable STATE (ST152).

In the example shown in FIGS. 3 and 4, a wait of 10 milliseconds is given in ST102 repeatedly executed, and 1 is added to the variable STATE_TIMER in ST112 repeatedly executed. That is, being determined that the value of the variable STATE_TIMER exceeds a predetermined value 10 in ST150 means that an abnormal state continues for 100 seconds (10×10 milliseconds). The value of 100 milliseconds is an example of the second predetermined time of the embodiment of the invention.

Then, when the value RESET is set in the variable STATE (YES in ST116), the value true indicating that the execution of reset processing is required is set in the variable TOUCH_RESET (ST118). According to the setting of the value true in the variable TOUCH_RESET, the reset section 24 performs reset processing.

Figure 5:
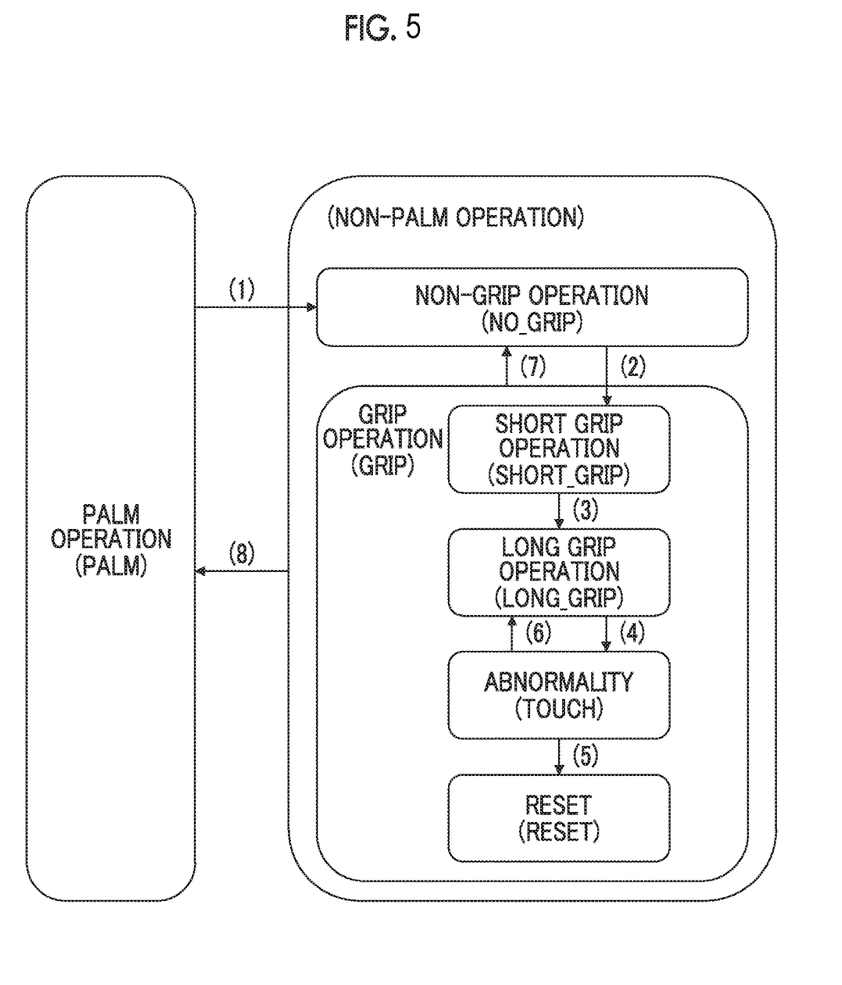
FIG. 5 is a state transition diagram of a determination state relevant to abnormal detection.

FIG. 5 is a state transition diagram corresponding to the operation described above, and shows the transition of the value of the variable STATE. As shown in FIG. 5, first, in a palm operation state (variable STATE=value PALM), detection of abnormalities and resetting based on abnormalities are not performed. Then, when the palm operation state is cleared, transition to a non-grip operation state (variable STATE=value NO_GRIP) occurs (1). Then, when a grip operation is determined, transition to a short grip operation state (variable STATE=value SHORT_GRIP) occurs (2). Then, when the duration of the short grip operation state exceeds the first predetermined time (for example, 60 seconds), transition to a long grip operation state (variable STATE=value LONG_GRIP) occurs (3). In addition, in a case where the peak value exceeds the first threshold value TOUCH_TH, transition to an abnormal state (variable STATE=TOUCH) occurs (4). Then, when the duration of the abnormal state exceeds the second predetermined time (for example, 100 milliseconds), transition to a reset state (variable STATE=value RESET) occurs (5). As described above, the reset section 24 performs reset processing according to the transition to a reset state. In addition, if the peak value becomes equal to or less than the first threshold value TOUCH_TH before the duration of the abnormal state exceeds the second predetermined time, the state returns to the long grip operation state (6). In any state, the state returns to the non-grip operation state (7) if a grip operation is not determined, and transitions to the palm operation state (8) if a palm operation is determined.

As described above, the input device 1 of the present embodiment includes: the sensor unit 10 for detecting the electrostatic capacitance that changes according to the proximity degree of an object with respect to the detection surface 11; the change amount calculating section 22 for calculating the temporal change amount of the detected electrostatic capacitance (difference between the detected electrostatic capacitance and the base value 33); the determination section 23 for determining a touch operation (first operation) corresponding to an operation on the detection surface 11 using a fingertip, a palm operation (second operation) corresponding to an operation on the detection surface 11 using a palm, and a grip operation (third operation) corresponding to an operation on the conductor portion 5, based on the calculated change amount; and the reset section 24 for performing reset processing in a case where the duration of a state, in which a palm operation is not determined and a grip operation is determined, is equal to or longer than the first predetermined time. Thus, in a state in which a grip operation is determined, the input device 1 detects an abnormality based on the duration, and performs reset processing. Accordingly, even in a case where an object is close, the input device 1 can suppress erroneous determination due to temperature changes or the like.

While the various embodiments of the invention have been described above, the invention is not limited only to the embodiments described above and includes various variations.

For example, although the input device 1 of the embodiment described above performs reset processing in a case where a state in which the peak value Z_MAX is equal to or greater than the first threshold value TOUCH_TH continues for the second predetermined time after the duration of a state in which a grip operation is determined becomes equal to or longer than the first predetermined time, the invention is not limited thereto. In another embodiment of the invention, in a case where the duration of a state in which a palm operation is not determined and a grip operation is determined continues for the first predetermined time or more, if a state in which the peak value Z_MAX is equal to or greater than the first threshold value TOUCH_TH is detected, reset processing may be performed without waiting for the passage of the second predetermined time.

In addition, for example, although the input device 1 of the embodiment described above performs reset processing in a case where the duration of a state in which a palm operation is not determined and a grip operation is determined is equal to or longer than the first predetermined time and the peak value is equal to or greater than the first threshold value TOUCH_TH, the invention is not limited thereto. In another embodiment of the invention, in a case where the duration of the state in which a palm operation is not determined and a grip operation is determined reaches the first predetermined time regardless of the peak value, reset processing may be performed.

The input device of the embodiment of the invention is not limited to a user interface device for inputting information based on the operation of a finger or the like. That is, the input device of the embodiment of the invention can be widely applied to various devices for inputting information according to the approach of various objects that are not limited to the human body.

It should be understood by those skilled in the art that various modifications, combinations, sub-combinations and alterations may occur depending on design requirements and other factors insofar as they are within the scope of the appended claims of the equivalents thereof.

What is claimed is:

1. An input device for inputting information, comprising:
a detection surface on which an operation is performed by an object to input information corresponding to the operation;
a conductive conductor portion disposed vertically to the detection surface, the conductor portion being rotatable along an outer edge of the detection surface;
a sensor that periodically detects an electrostatic capacitance that changes according to a degree of proximity of the object with respect to the detection surface at detection positions thereof;
a change amount calculation unit configured to calculate an amount of a temporal change in the detected electrostatic capacitance;
a determination unit configured to determine, based on the calculated amount of the temporal change, a first operation indicating the operation on the detection surface by a fingertip, a second operation indicating the operation on the detection surface by a palm, and a third operation indicating an operation on the conductor portion, by specifying a region on the detection surface in which the calculated amount of the temporal change is equal to or greater than a threshold value, and determining a number of detection positions in vicinity of the outer edge of the detection surface at which the calculated amount of the temporal change is equal to or greater than a threshold value, such that the second operation is determined when a size of the region is equal to or greater than a predetermined size, and that the third operation is determined when the number is equal to or greater than a predetermined number; and
a reset unit configured to perform a reset processing if a set of conditions are met, the set of conditions including:
an occurrence of a first determination state in which the second operation is not determined while the third operation is determined; and
a duration of the first determination state which is equal to or longer than a first predetermined time period.

2. A input device for inputting information comprising:
a detection surface on which an operation is performed by an object to input information corresponding to the operation;
a conductive conductor portion disposed along an outer edge of the detection surface;
a sensor that periodically detects an electrostatic capacitance that changes according to a degree of proximity of the object with respect to the detection surface; and
a processor including:
a change amount calculation unit configured to calculate an amount of a temporal change in the detected electrostatic capacitance;
a determination unit configured to determine, based on the calculated amount of the temporal change, a first operation indicating the operation on the detection surface by a fingertip, a second operation indicating the operation on the detection surface by a palm, and a third operation indicating an operation on the conductor portion; and
a reset unit configured to perform a reset processing if a set of conditions are met, the set of conditions including:
an occurrence of a first determination state in which the second operation is not determined while the third operation is determined;
a duration of the first determination state which is equal to or longer than a first predetermined time period; and
a peak value equal to or greater than a first threshold value, the peak value being a spatial maximum value of the calculated amount of the temporal change detected on the detection surface.

3. The input device according to claim 2, wherein the set of conditions further include:
the peak value equal to or greater than the first threshold value which is maintained for a second predetermined time period after the duration of the first determination state becomes equal to or longer than the first predetermined time period.

4. The input device according to claim 2,
wherein the determination unit determines the first operation if the peak value is equal to or greater than the first threshold value.

5. The input device according to claim 2,
wherein the determination unit further determines a region on the detection surface in which the calculated amount of the temporal change is equal to or greater than a second threshold value, the determination unit determining the second operation if a size of the region is equal to or greater than a predetermined size.

6. The input device according to claim 2,
wherein the determination unit determines the third operation based on the amount of the temporal change in vicinity of the outer edge of the detection surface.

7. The input device according to claim 2,
wherein the change amount calculation unit obtains the amount of the temporal change by calculating a difference between the detected electrostatic capacitance and a base value, the base value being an electrostatic capacitance when no object is close to the detection surface,
and wherein the reset processing includes resetting the base value.

8. A control method of an input device including a detection surface on which an operation is performed by an object to input information corresponding to the operation, and a conductive conductor portion disposed along an outer edge of the detection surface, the control method comprising:
periodically detecting an electrostatic capacitance that changes according to a degree of proximity of the object with respect to the detection surface;
calculating an amount of a temporal change in the detected electrostatic capacitance;
determining, based on the calculated amount of the temporal change, a first operation indicating the operation on the detection surface by a fingertip, a second operation indicating the operation on the detection surface by a palm, and a third operation indicating an operation on the conductor portion; and
performing a reset processing if a set of conditions are met, the set of conditions including:
an occurrence of a first determination state in which the second operation is not determined while the third operation is determined;
a duration of the first determination state is equal to or longer than a first predetermined time period; and
a peak value equal to or greater than a first threshold value, the peak value being a spatial maximum value of the calculated amount of the temporal change detected on the detection surface.

9. The control method of an input device according to claim 8, wherein the set of conditions further include:
the peak value equal to or greater than the first threshold value which is maintained for a second predetermined time period after the duration of the first determination state becomes equal to or longer than the first predetermined time period.

10. The control method of an input device according to claim 8,
wherein, in the determining, the first operation is determined if the peak value is equal to or greater than the first threshold value.

11. The control method of an input device according to claim 8,
wherein the determining further determines a region on the detection surface in which the calculated amount of the temporal change is equal to or greater than a second threshold value, and the second operation is determined if a size of the region is equal to or greater than a predetermined size.

12. The control method of an input device according to claim 8,
wherein, in the determining, the third operation is determined based on the amount of the temporal change in vicinity of the outer edge of the detection surface.

13. The control method of an input device according to claim 8,
wherein, in the calculating, the amount of the temporal change is obtained by calculating a difference between the detected electrostatic capacitance and a base value, the base value being an electrostatic capacitance when no object is close to the detection surface, and wherein the reset processing includes resetting the base value.

14. A non-transitory computer-readable storage medium with an executable program stored thereon, wherein the program causing a computer to execute the control method of an input device according to claim 8.

15. The input device according to claim 1, wherein the conductor portion has a tubular shape.

16. The input device according to claim 1, wherein the conductor portion has a cylindrical shape.

17. The input device according to claim 1, wherein the change amount calculation unit obtains the amount of the temporal change by calculating a difference between the detected electrostatic capacitance and a base value, the base value being an electrostatic capacitance when no object is close to the detection surface, and wherein the reset processing includes resetting the base value.

* * * * *